US007783933B2

(12) United States Patent
Archer et al.

(10) Patent No.: US 7,783,933 B2
(45) Date of Patent: Aug. 24, 2010

(54) IDENTIFYING FAILURE IN A TREE NETWORK OF A PARALLEL COMPUTER

(75) Inventors: Charles J. Archer, Rochester, MN (US); Kurt W. Pinnow, Rochester, MN (US); Brian P. Wallenfelt, Eden Prairie, MN (US)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 11/531,787

(22) Filed: Sep. 14, 2006

(65) Prior Publication Data
US 2008/0072101 A1 Mar. 20, 2008

(51) Int. Cl.
*G06F 11/00* (2006.01)
(52) U.S. Cl. ...................................... 714/47
(58) Field of Classification Search ............. 714/25–27, 714/30–38, 45–48
See application file for complete search history.

(56) References Cited

U.S. PATENT DOCUMENTS

| | | | | |
|---|---|---|---|---|
| 5,652,833 A | * | 7/1997 | Takizawa et al. ............. 714/10 |
| 5,710,938 A | * | 1/1998 | Dahl et al. ................... 712/13 |
| 6,567,909 B2 | * | 5/2003 | Tsuruta et al. ............... 712/15 |
| 6,665,268 B1 | * | 12/2003 | Sato et al. ................... 370/242 |
| 6,876,988 B2 | * | 4/2005 | Helsper et al. ............... 706/21 |
| 2005/0240933 A1 | * | 10/2005 | Barsness et al. ............. 718/105 |
| 2006/0248370 A1 | * | 11/2006 | Almasi et al. ................ 714/4 |
| 2007/0033511 A1 | * | 2/2007 | Davies ......................... 714/799 |
| 2008/0263329 A1 | * | 10/2008 | Archer et al. ................ 712/213 |

* cited by examiner

Primary Examiner—Nadeem Iqbal
(74) Attorney, Agent, or Firm—Biggers & Ohanian, LLP

(57) ABSTRACT

Methods, parallel computers, and products are provided for identifying failure in a tree network of a parallel computer. The parallel computer includes one or more processing sets including an I/O node and a plurality of compute nodes. For each processing set embodiments include selecting a set of test compute nodes, the test compute nodes being a subset of the compute nodes of the processing set; measuring the performance of the I/O node of the processing set; measuring the performance of the selected set of test compute nodes; calculating a current test value in dependence upon the measured performance of the I/O node of the processing set, the measured performance of the set of test compute nodes, and a predetermined value for I/O node performance; and comparing the current test value with a predetermined tree performance threshold. If the current test value is below the predetermined tree performance threshold, embodiments include selecting another set of test compute nodes. If the current test value is not below the predetermined tree performance threshold, embodiments include selecting from the test compute nodes one or more potential problem nodes and testing individually potential problem nodes and links to potential problem nodes.

19 Claims, 6 Drawing Sheets

IDENTIFYING FAILURE IN A TREE NETWORK OF A PARALLEL COMPUTER

GOVERNMENT RIGHTS IN INVENTION

This invention was made with Government support under Contract No. B519700 awarded by the Department of Energy. The Government has certain rights in this invention.

BACKGROUND OF THE INVENTION

1. Field of the Invention

The field of the invention is data processing, or, more specifically, methods, parallel computers, and products for identifying failure in a tree network of a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x,y,z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers.

A torus network lends itself to point to point geometrically aware diagnostics, but a tree network typically is inefficient in point to point communication. A tree network, however, does provide high bandwidth and low latency for certain collective operations, message passing operations where all compute nodes participate simultaneously. Because thousands of nodes may participate in data processing operations on a parallel computer, identifying failure in a tree network in a parallel computer is difficult.

SUMMARY OF THE INVENTION

Methods, parallel computers, and products are provided for identifying failure in a tree network of a parallel computer. The parallel computer includes one or more processing sets including an I/O node and a plurality of compute nodes. For each processing set embodiments include selecting a set of test compute nodes, the test compute nodes being a subset of the compute nodes of the processing set; measuring the performance of the I/O node of the processing set; measuring the performance of the selected set of test compute nodes; calculating a current test value in dependence upon the measured performance of the I/O node of the processing set, the measured performance of the set of test compute nodes, and a predetermined value for I/O node performance; and comparing the current test value with a predetermined tree performance threshold. If the current test value is below the predetermined tree performance threshold, embodiments include selecting another set of test compute nodes. If the current test value is not below the predetermined tree performance threshold, embodiments include selecting from the test compute nodes one or more potential problem nodes and testing individually potential problem nodes and links to potential problem nodes.

The foregoing and other objects, features and advantages of the invention will be apparent from the following more particular descriptions of exemplary embodiments of the

DETAILED DESCRIPTION OF EXEMPLARY EMBODIMENTS

Figure 1:
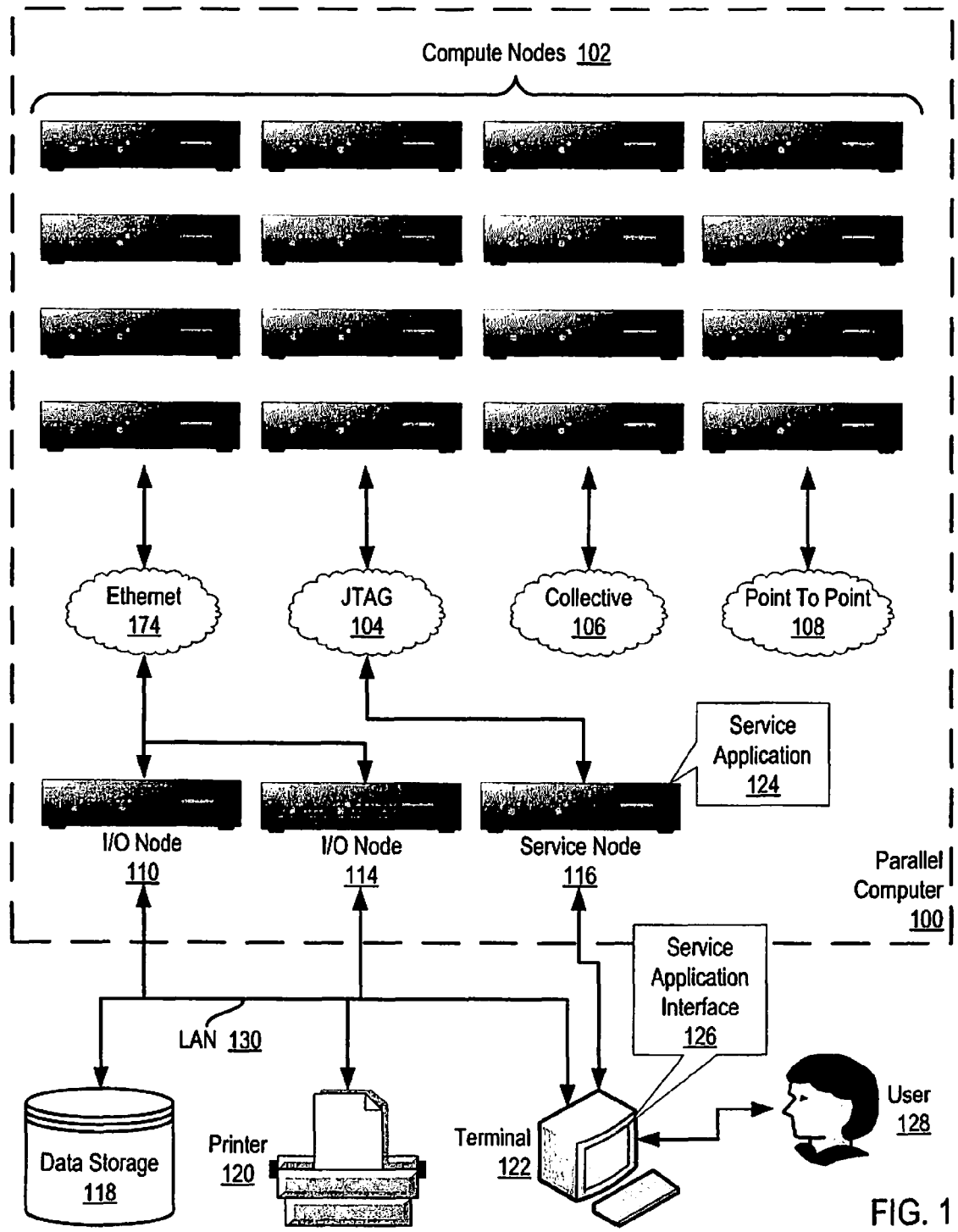
FIG. 1 illustrates an exemplary system for identifying failure in a tree network of a parallel computer according to embodiments of the present invention.

Exemplary methods, parallel computers, and computer program products for identifying failure in a tree network of a parallel computer according to embodiments of the present invention are described with reference to the accompanying drawings, beginning with FIG. 1. FIG. 1 illustrates an exemplary system for identifying failure in a tree network of a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a collective operations network (106), and a point to point operations network (108). Collective operations network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

As described in more detail below in this specification, the system of FIG. 1 operates generally to identify failure in a tree network of the parallel computer according to the present invention. The system of FIG. 1 identifies failure in a tree network of the parallel computer by repeatedly, for each processing set, selecting a set of test compute nodes, the test compute nodes being a subset of the compute nodes of the processing set; measuring the performance of the I/O node of the processing set; measuring the performance of the selected set of test compute nodes; calculating a current test value in dependence upon the measured performance of the I/O node of the processing set, the measured performance of the set of test compute nodes, and a predetermined value for I/O node performance; and comparing the current test value with a predetermined tree performance threshold; If the current test value is below the predetermined tree performance threshold, the system of FIG. 1 selects another set of test compute nodes. If the current test value is not below the predetermined tree performance threshold, the system of FIG. 1 selects from the test compute nodes one or more potential problem nodes and tests individually potential problem nodes and links to potential problem nodes.

In addition to compute nodes, computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). A processing set is an I/O node and a plurality of compute nodes associated with that I/O node.

Computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the compute nodes, and so on. Service node (116) runs a service application (124) and communicates with users (128) through a service application interface (126) that runs on computer terminal (122).

Routing communications around a defective link may be part of a point to point operation or a collective operation, and the second network through which communications data is routed around a defective link may or may not be optimized for the operation in effect when the routing around occurs. If routing around a defective link occurs as part of a point to point operation in a network optimized for point to point operations, such as, for example, a torus, then the second network through which a data packet is routed around a defective link may be a network that is optimized for collective operations rather than point to point operations, such as, for example, a collective tree network. If routing around a defective link occurs as part of a collective operation in a network optimized for collective operations, such as, for example, a tree network, then the second network through which a data packet is routed around a defective link may be a network that is optimized for point to point rather than collective operations, such as, for example, a torus network.

A collective operation is an operation, a message-passing computer program instruction that is executed simultaneously, that is, at approximately the same time, by all the compute nodes in a 'plurality' or 'group' of compute nodes. Such a plurality or group of compute nodes may include all the compute nodes in the parallel computer (100) or a subset all the compute nodes. In MPI terminology, such a 'plurality' or 'group' may be defined as a 'communicator.'

'MPI' refers to 'Message Passing Interface,' a parallel communications library, a module of computer program instructions for data communications on parallel computers. Examples of parallel communications libraries that may be improved for identifying failure in a tree network of a parallel computer according to embodiments of the present invention include MPI and the 'Parallel Virtual Machine' ('PVM') library. PVM was developed by the University of Tennessee, The Oak Ridge National Laboratory, and Emory University.

MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Collective operations are composed of many point to point messages executed more or less concurrently (depending on the operation and the internal algorithm) and involve all processes running in a given group of compute nodes, that is, in a given MPI communicator. Every process on every compute node in the group must call or execute the same collective operation at approximately the same time. The required simultaneity is described as approximate because many processes running on many separate, physical compute node cannot be said to do anything all together at exactly the same time. Parallel communications libraries provide functions to support synchronization. In the MPI example, such a synchronization function is a 'barrier' routine. To synchronize, all processes on all compute nodes in a group call MPI_barrier( ), for example, and then all processes wait until all processes reach the same point in execution. Then execution continues, with substantial synchronization.

Most collective operations are variations or combinations of four basic operations: broadcast, gather, scatter, and reduce. In a broadcast operation, all processes specify the same root process, whose buffer contents will be sent. Processes other than the root specify receive buffers. After the operation, all buffers contain the message from the root process.

A scatter operation, like the broadcast operation, is also a one-to-many collective operation. All processes specify the same receive count. The send arguments are only significant to the root process, whose buffer actually contains sendcount*N elements of a given datatype, where N is the number of processes in the given group of compute nodes. The send buffer will be divided equally and dispersed to all processes (including itself). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from compute node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

| | |
|---|---|
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

The arrangement of nodes, networks, and I/O devices making up the exemplary system illustrated in FIG. 1 are for explanation only, not for limitation of the present invention. Data processing systems capable of identifying failure in a tree network of a parallel computer according to embodiments of the present invention may include additional nodes, networks, devices, and architectures, not shown in FIG. 1, as will occur to those of skill in the art. The parallel computer (100) in the example of FIG. 1 includes sixteen compute nodes (102); parallel computers capable of identifying failure in a tree network according to embodiments of the present invention sometimes include thousands of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Identifying failure in a tree network according to embodiments of the present invention is generally implemented on a parallel computer that includes a plurality of compute nodes. In fact, such computers may include thousands of such compute nodes. Each compute node is in turn itself a kind of computer composed of one or more computer processors, its own computer memory, and its own input/output adapters. For further explanation, therefore, FIG. 2 sets forth a block diagram of an exemplary compute node useful in a parallel computer capable of identifying failure in a tree network according to embodiments of the present invention. The compute node (152) of FIG. 2 includes at least one computer processor (164) as well as random access memory ('RAM') (156). Processor (164) is connected to RAM (156) through a high-speed memory bus (154) and through a bus adapter (194) and a extension bus (168) to other components of the compute node.

Stored in RAM (156) is a diagnostic application program (158), a module of computer program instructions that carries out parallel, user-level data processing using parallel algorithms. Diagnostics application program (158) contains computer program instructions that operate, along with other programs on other compute nodes in a parallel computer, to identify failure in a tree network of a parallel computer according to embodiments of the present invention by, for each processing set, selecting a set of test compute nodes, the test compute nodes being a subset of the compute nodes of the processing set; measuring the performance of the I/O node of the processing set; measuring the performance of the selected set of test compute nodes; calculating a current test value in dependence upon the measured performance of the I/O node of the processing set, the measured performance of the set of test compute nodes, and a predetermined value for I/O node performance; comparing the current test value with a predetermined tree performance threshold; and if the current test value is below the predetermined tree performance threshold, selecting another set of test compute nodes; and if the current test value is not below the predetermined tree performance threshold, selecting from the test compute nodes one or more potential problem nodes and testing individually potential problem nodes and links to potential problem nodes.

Also stored RAM (156) is a parallel communications library (160), a library of computer program instructions that carry out parallel communications among compute nodes, including point to point operations as well as collective operations. Application program (158) executes collective operations by calling software routines in parallel communications library (160). A library of parallel communications routines may be developed from scratch for use in identifying failure in a tree network of a parallel computer according to embodiments of the present invention, using a traditional programming language such as the C programming language, and using traditional programming methods to write parallel communications routines that send and receive data among nodes on two independent data communications networks. Alternatively, existing prior art libraries may be used. Examples of parallel communications libraries that may be improved for identifying failure in a tree network of a parallel computer include the 'Message Passing Interface' ('MPI') library and the 'Parallel Virtual Machine' ('PVM') library. However it is developed, the parallel communications routines of parallel communication library (160) are improved to identify failure in a tree network of a parallel computer according to embodiments of the present invention by, for each processing set, selecting a set of test compute nodes, the test compute nodes being a subset of the compute nodes of the processing set; measuring the performance of the I/O node of the processing set; measuring the performance of the selected set of test compute nodes; calculating a current test value in dependence upon the measured performance of the I/O node of the processing set, the measured performance of the set of test compute nodes, and a predetermined value for I/O node performance; comparing the current test value with a predetermined tree performance threshold; and if the current test value is below the predetermined tree performance threshold, selecting another set of test compute nodes; and if the current test value is not below the predetermined tree performance threshold, selecting from the test compute nodes one or more potential problem nodes and testing individually potential problem nodes and links to potential problem nodes.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex that those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
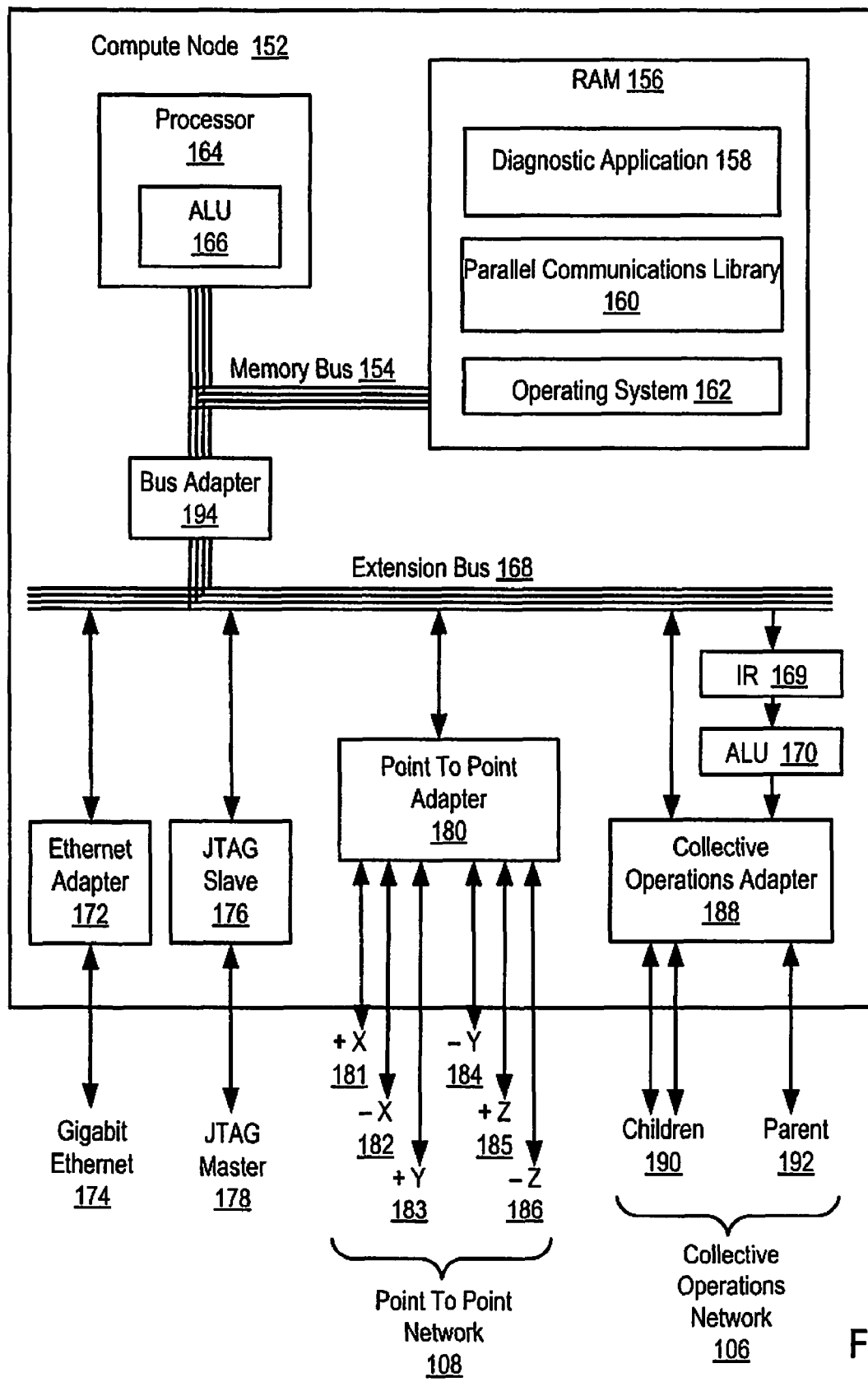
FIG. 2 sets forth a block diagram of an exemplary compute node useful in identifying failure in a tree network of a parallel computer according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as USB, through data communications networks such as IP networks, and in other ways as will occur to those of skill in the art. Communications adapters implement the hardware level of data communications through which one computer sends data communications to another computer, directly or through a network. Examples of communications adapters useful in systems for identifying failure in a tree network of a parallel computer include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: It typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in identifying failure in a tree network of a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Collective Operations Adapter (188) that couples example compute node (152) for data communications to a network (106) that is optimal for collective message passing operations such as, for example, a network configured as a binary tree. Collective Operations Adapter (188) provides data communications through three bidirectional links: two to children nodes (190) and one to a parent node (192).

Example compute node (152) includes two arithmetic logic units ('ALUs'). ALU (166) is a component of processor (164), and a separate ALU (170) is dedicated to the exclusive use of collective operations adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, collective operations adapter (188) may execute the arithmetic or logical operation by use of ALU (166) in processor (164) or, typically much faster, by use dedicated ALU (170).

Figure 3A:
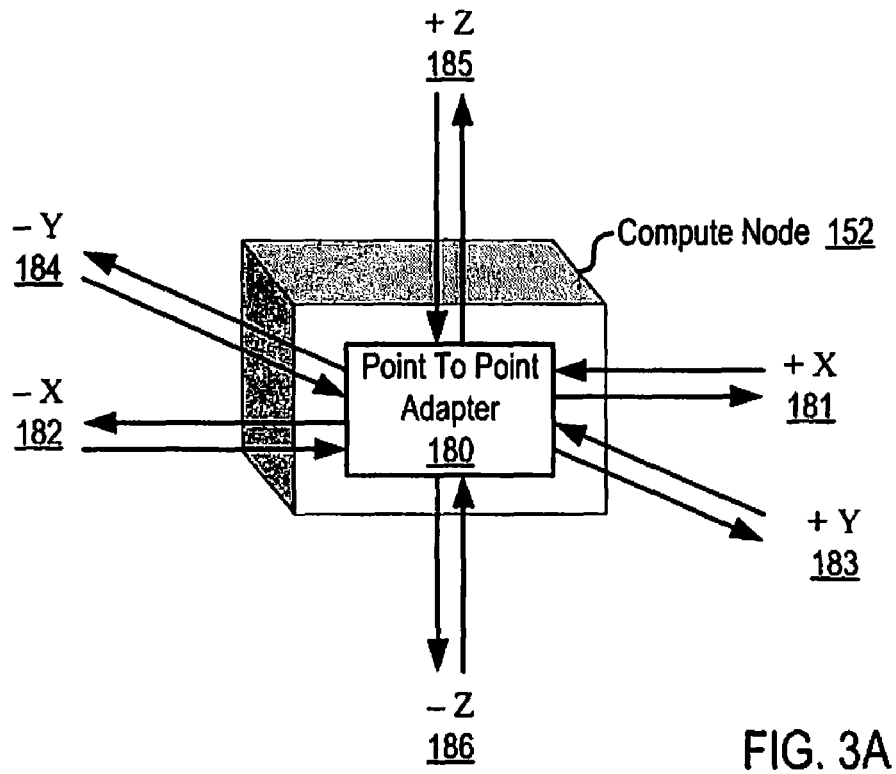
FIG. 3A illustrates an exemplary Point To Point Adapter useful in systems that identify failure in a tree network of a parallel computer according to embodiments of the present invention.

For further explanation, FIG. 3A illustrates an exemplary Point To Point Adapter (180) useful in systems that identify failure in a tree network of a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in also provides data communication along a z-axis through four unidirectional data communications links, to and from the next node in the −z direction (186) and to and from the next node in the +z direction (185).

Figure 3B:
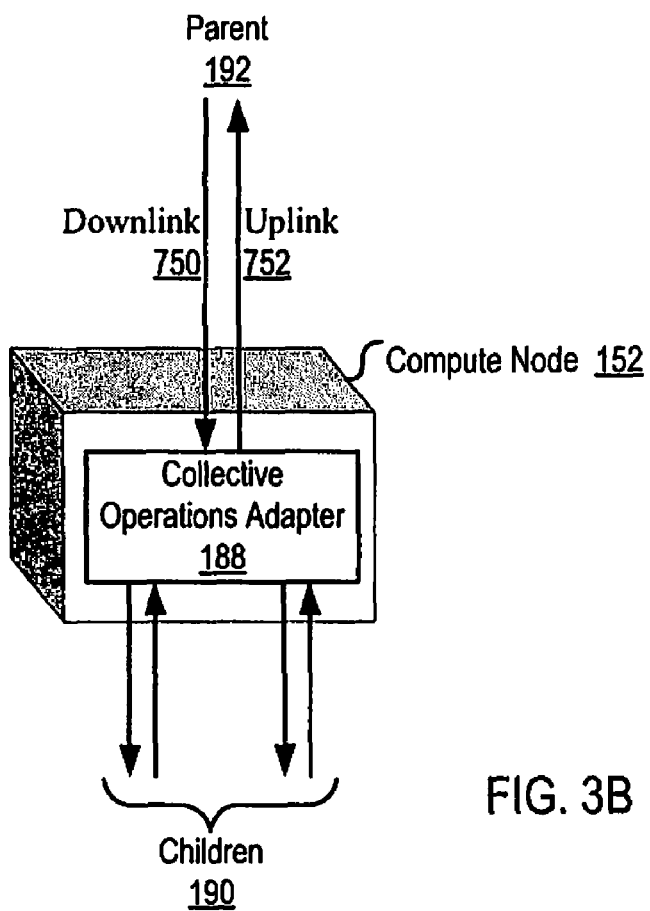
FIG. 3B illustrates an exemplary Collective Operations Adapter useful in systems that identify failure in a tree network of a parallel computer according to embodiments of the present invention.

For further explanation, FIG. 3B illustrates an exemplary Collective Operations Adapter (188) useful in systems that identify failure in a tree network of a parallel computer according to embodiments of the present invention. Collective Operations Adapter (188) is designed for use in a network optimized for collective operations, a network that organizes compute nodes of a parallel computer in a binary tree. Collective Operations Adapter (188) in the example of FIG. 3B provides data communication to and from two children nodes through four unidirectional data communications links (190). Collective Operations Adapter (188) also provides data communication to and from a parent node through two unidirectional data communications links (192).

Figure 4:
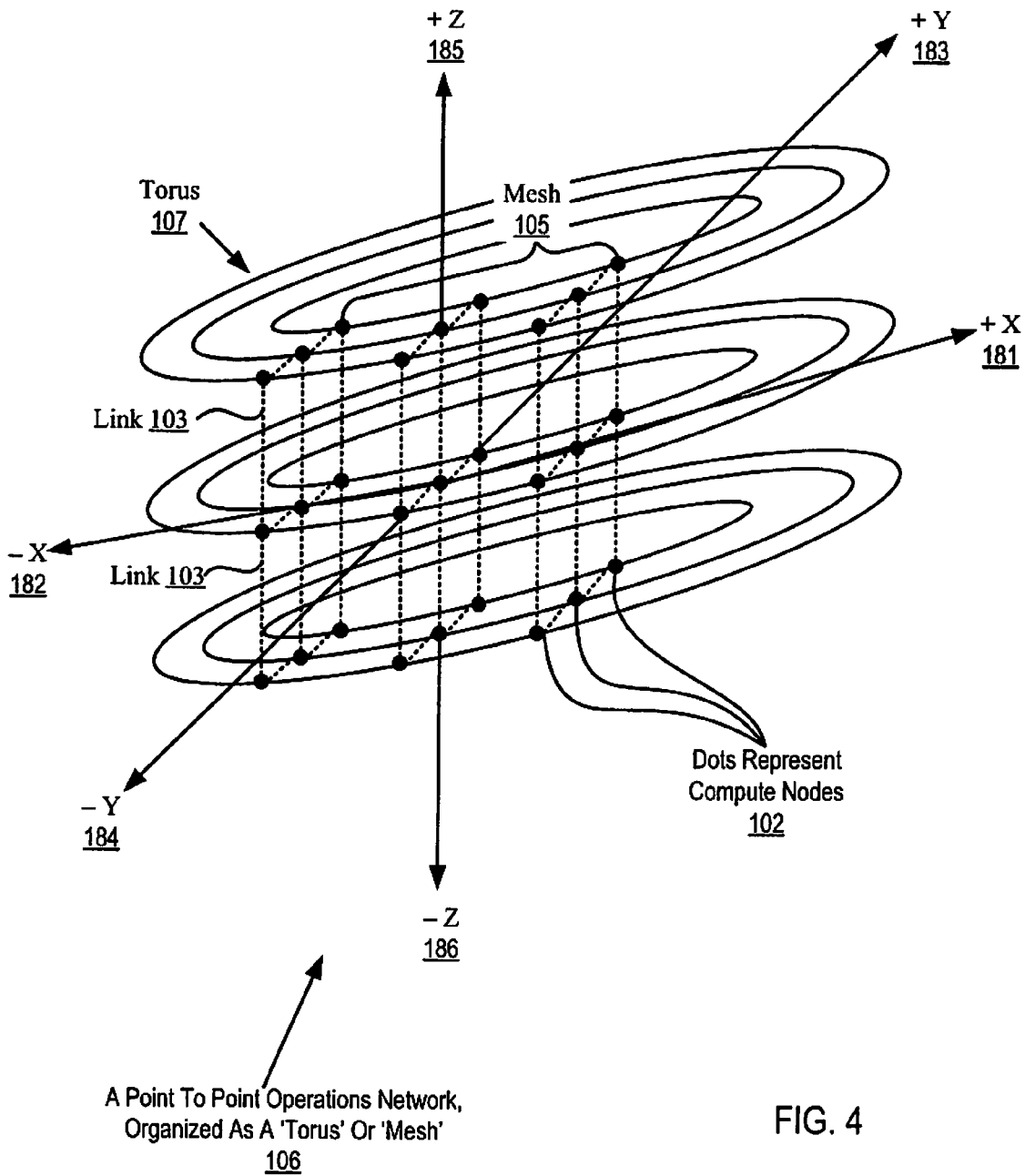
FIG. 4 illustrates an exemplary data communications network optimized for point to point operations.

For further explanation, FIG. 4 illustrates an exemplary data communications network optimized for point to point operations (106). In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105) that wraps around to form a torus (107). Each compute node in the torus has a location in the torus that is uniquely specified by a set of x, y, z coordinates. For clarity of explanation, the data communications network of FIG. 4 is illustrated with only 27 compute nodes, but readers will recognize that a data communications network optimized for point to point operations in accordance with embodiments of the present invention may contain only a few compute nodes or may contain thousands of compute nodes.

Figure 5:
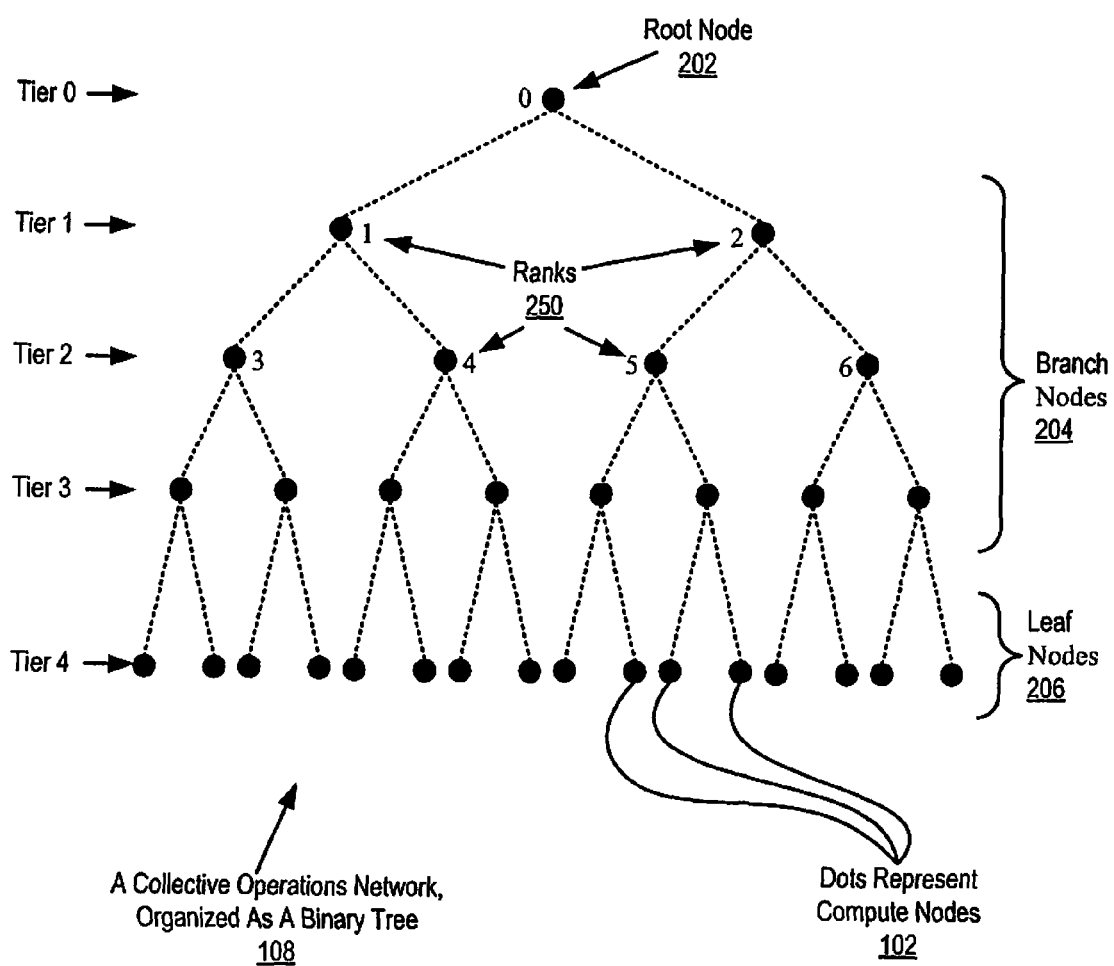
FIG. 5 illustrates an exemplary data communications network optimized for collective operations.

For further explanation, FIG. 5 illustrates an exemplary data communications network optimized for collective operations (108). The example data communications network of FIG. 5 includes compute nodes data communications links connected to the compute nodes so as to organize the compute nodes as a tree. In the example of FIG. 5, dots represent compute nodes (102) of a parallel computer, and the dotted lines between the dots represent data communications links between compute nodes. The data communications links are implemented with collective operations data communications adapters similar to the one illustrated for example in FIG. 3B, with each node typically providing data communications to and from two children nodes and data communications to and from a parent node, with some exceptions. Nodes in a binary tree may be characterized as a root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (108). For clarity of explanation, the data communications network of FIG. 5 is illustrated with only 31 compute nodes, but readers will recognize that a data communications network optimized for collective operations for use in identifying failure in a tree network of a parallel computer in accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

In the example of FIG. 5, the tree network (108) is characterized by a root compute node (202) and a plurality of tiers of compute nodes, Tier 0, Tier 1, and so on. The tiers of compute nodes are defined by the number of data communications links between the compute nodes of a tier and the root compute node (202). The compute node in Tier 0 has zero data communications links between the compute nodes in Tier 0 and the root node (202)—which is the only compute node in Tier 0. Each compute node in Tier 1 has one data communications link between it and the root node (202). Each compute node in Tier 2 has two data communications links between it and the root node (202). And so on.

The tiers of the network tree of FIG. 5 are numbered in integer sequence beginning with the tier containing the root node as Tier 0 and continuing with Tier 1, Tier 2, and so on. The fact that the tiers are numbered in integer sequence means that the tiers of compute nodes in the example of FIG. 5 include even-numbered tiers of compute nodes and odd-numbered tiers of compute nodes. Even-numbered tiers include Tier 0, Tier 2, and so on. Odd-numbered tiers include Tier 1, Tier 3, and so on.

Figure 6:
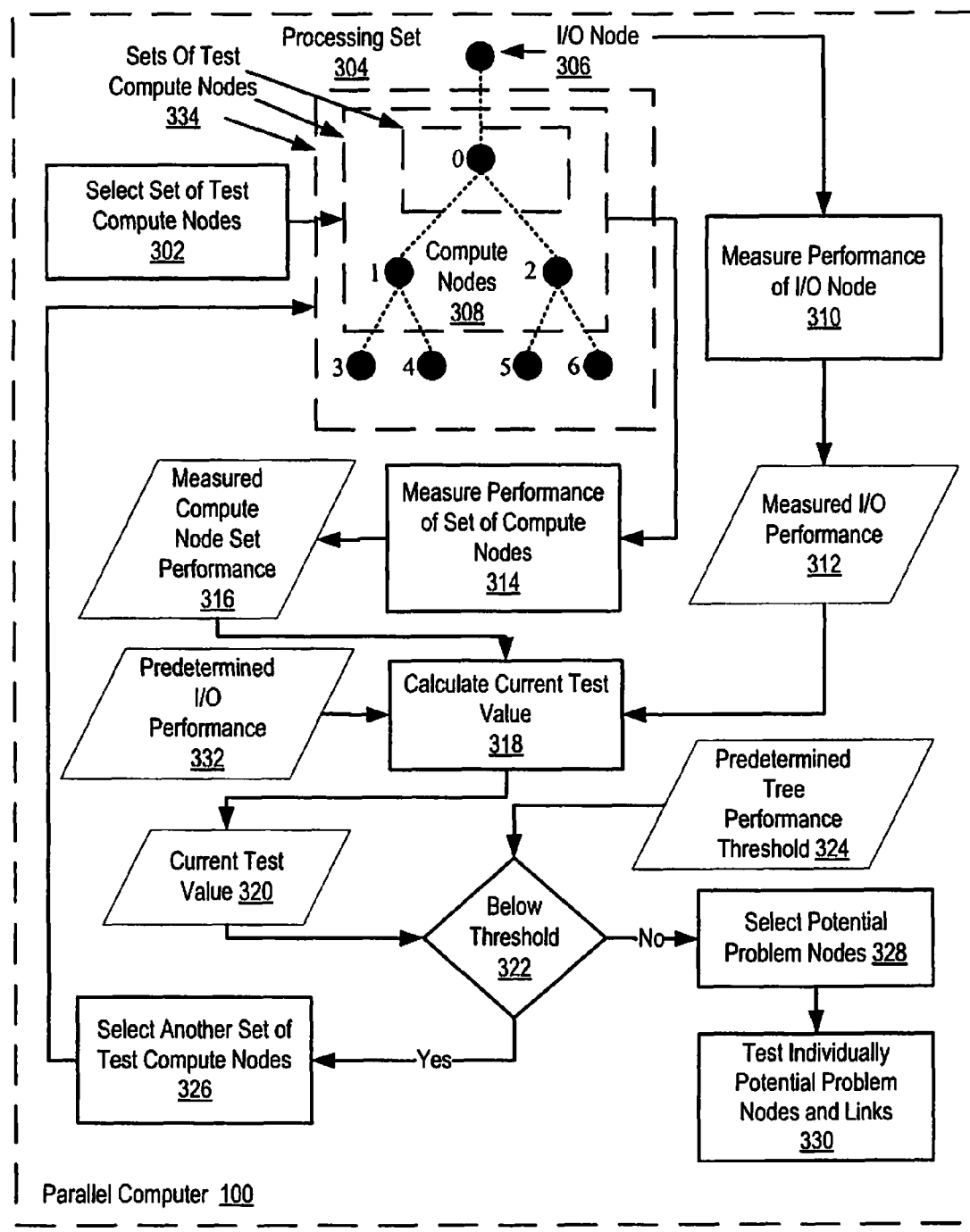
FIG. 6 sets forth a flow chart illustrating an exemplary method of identifying failure in a tree network of a parallel computer according to embodiments of the present invention.

For further explanation, FIG. 6 sets forth a flow chart illustrating an exemplary method for identifying failure in a tree network of a parallel computer (100). The method of FIG. 6 is carried out in a parallel computer (100) that includes a plurality of processing sets (304). A processing set (304) includes an I/O node (306) and a plurality of compute nodes (308). The exemplary parallel computer (100) of FIG. 6 has only one processing set (304). This is for ease of explanation only, and not for limitation. In fact, parallel computers capable of identifying failure in a tree network according to the present invention may include hundreds or thousands of processing sets as will occur to those of skill in the art.

The method of FIG. 6 is an iterative method carried out for each processing set. The method of FIG. 6 includes selecting (302) a set (334) of test compute nodes. The selected set of the test compute nodes are a subset of the compute nodes (308) of the processing set (304). Upon each iteration of the method of FIG. 6, the set of test compute nodes (334) selected grows by adding another tier of compute nodes in the sub-tree of the processing set. That is, in the first iteration of the method of FIG. 6, the set of test compute nodes selected includes only compute node 0. In the second iteration of the method of FIG. 6, the set of test compute nodes selected includes compute nodes 1 and 2. And in the third iteration of the method of FIG. 6, the set of test compute nodes selected includes compute nodes 3, 4, 5 and 6, and so on.

In the method of FIG. 6, selecting (302) a set (334) of test compute nodes typically also includes mapping the tree structure of the compute nodes to physical locations of the compute nodes in the parallel computer. Mapping the tree structure of the compute nodes to physical locations of the compute nodes in the parallel computer maps the logical compute not in the tree structure to an x-y-z physical location in the parallel computer.

The method of FIG. 6 also includes measuring (310) the performance of the I/O node (306) of the processing set (304). Measuring (310) the performance of the I/O node (306) of the processing set (304) may be carried out by performing an I/O function, such as a read or write to a table in data storage, and timing the performance of the I/O function.

The method of FIG. 6 also includes measuring (314) the performance of the selected set (334) of test compute nodes. Measuring (314) the performance of the selected set (334) of test compute nodes may be carried out by performing an operation, such as for example, a collective operation on the selected test compute and timing the performance of the operation.

The method of FIG. 6 includes calculating (318) a current test value (320) in dependence upon the measured performance (312) of the I/O node of the processing set (304), the measured performance (316) of the set of test compute nodes (334), and a predetermined value (332) for I/O node performance. Calculating (318) a current test value (320) may be carried out according to the following formula:

$$CTV = KGIO/CHIO * CHT$$

In the exemplary formula above, 'CTV' represents the current test value derived from the formula. In the exemplary formula above, 'KGIO' represents a known-good I/O node performance measurement. Such a known-good I/O node performance measurement may be previously determined and established as a known-good result for implementing the method of FIG. 6. In the exemplary formula above, 'CHIO' represents the current measured I/O performance. In the exemplary formula above, 'CHT' represents the value of the measured performance of the selected set of test compute nodes.

The method of FIG. 6 includes comparing (322) the current test value (318) with a predetermined tree performance threshold (324). A predetermined tree performance threshold (324) is a value derived from previous testing of known-good compute nodes to establish a threshold for identifying a failure in the tree network according to the method of FIG. 6. Such a predetermined tree performance threshold is typically set at a value beyond which a failure in the tree network is presumed.

In the method of FIG. 6, if the current test value (318) is below the predetermined tree performance threshold (324), the selected set of test compute nodes are identified as good and not failing and the method of FIG. 6 includes selecting (326) another set (334) of test compute nodes. Selecting (326) another set (334) of test compute nodes my be carried out by including within the set of test compute nodes the next tier of compute nodes in the processing set. As discussed above, the method of FIG. 6 is an iterative method carried out for each processing set. Upon each iteration of the method of FIG. 6 the set of test compute nodes (334) selected may be grown by adding another tier of compute nodes in the sub-tree of the processing set. That is, in the first iteration of the method of FIG. 6, the set of test compute nodes selected includes only compute node 0. In the second iteration of the method of FIG. 6, the set of test compute nodes selected includes compute nodes 1 and 2. And in the third iteration of the method of FIG. 6, the set of test compute nodes selected includes compute nodes 3, 4, 5 and 6, and so on.

If the current test value is not below the predetermined tree performance threshold (324), the method of FIG. 6 identifies the current set of test compute nodes as including a failure and further includes selecting (326) from the test compute nodes one or more potential problem nodes. Selecting (328) from the test compute nodes (334) one or more potential problem nodes may be carried out by selecting the deepest tier of the current test compute nodes. The deepest tier of test compute nodes may be selected as potential problem nodes because on previous iterations of the method of FIG. 6, the selected test nodes, that did not include the deepest tier, were identified as good and not failing, and upon the current iteration of the method of FIG. 6, the current set of test compute nodes that include the deepest tier were identified as including a failure.

The failure in the more or more potential problem nodes may be a failure in one or more of the potential problem nodes of a failure in a link to one or more of the potential problem nodes. To identify the failure the method of FIG. 6 includes, testing (330) individually potential problem nodes and links to potential problem nodes. Testing (330) individually potential problem nodes and links to potential problem nodes may be carried out by employing a high-overhead diagnostic to each potential problem node and each link to each potential problem node. One such high-overhead diagnostic such as for example, performing an operation on each potential problem node and comparing the result of the operation with a known result.

Upon identifying the one or more failing nodes or links to nodes, the method of FIG. 6 may also include failing over to a torus network of the parallel computer. Failing over to a torus network of the parallel computer provides an alternative network to continue operations of the parallel computer.

Upon identifying the one or more failing nodes or links to nodes, the method of FIG. 6 may also include removing one or more the potential problem nodes identified as having a problem from the tree network of the parallel computer. Removing the potential problem nodes from the tree network of the parallel computer advantageously removes the identified failure from the tree network.

Upon identifying the one or more failing nodes or links to nodes, the method of FIG. 6 may also include saving current data and shutting down the parallel computer. Saving current data allows the current data to be saved such that it is not lost upon repairing the identified failure.

Exemplary embodiments of the present invention are described largely in the context of a fully functional computer system for identifying failure in a tree network of a parallel computer. Readers of skill in the art will recognize, however, that the present invention also may be embodied in a computer program product disposed on signal bearing media for use with any suitable data processing system. Such signal bearing media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethemets™ and networks that communicate with the Internet Protocol and the World Wide Web. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A computer-implemented method for identifying failure in a tree network of a parallel computer, the parallel computer comprising one or more processing sets including an I/O node and a plurality of compute nodes; and the method comprising for each processing set:
    selecting a set of test compute nodes, the test compute nodes being a subset of the compute nodes of the processing set;
    measuring the performance of the I/O node of the processing set;
    measuring the performance of the selected set of test compute nodes;
    calculating a current test value in dependence upon the measured performance of the I/O node of the processing set, the measured performance of the set of test compute nodes, and a predetermined value for I/O node performance;
    comparing the current test value with a predetermined tree performance threshold; and
    if the current test value is below the predetermined tree performance threshold, selecting another set of test compute nodes; and
    if the current test value is not below the predetermined tree performance threshold, selecting from the test compute nodes one or more potential problem nodes and testing individually potential problem nodes and links to potential problem nodes.

2. The method of claim 1 wherein selecting a set of test compute nodes further comprises mapping the tree structure of the compute nodes to physical locations of the compute nodes in the parallel computer.

3. The method of claim 1 wherein selecting another set of test compute nodes further comprises including within the set of test compute nodes the next tier of compute nodes in the processing set.

4. The method of claim 1 wherein selecting from the test compute nodes one or more potential problem nodes further comprises selecting the deepest tier of test compute nodes.

5. The method of claim 1 wherein testing individually potential problem nodes and links to potential problem nodes further comprising employing a high-overhead diagnostic to each potential problem node and each link to each potential problem node.

6. The method of claim 1 further comprising failing over to a torus network of the parallel computer if the current test value is below the predetermined tree performance threshold.

7. The method of claim 1 further comprising removing the potential problem nodes from the tree network of the parallel computer if the current test value is below the predetermined tree performance threshold.

8. The method of claim 1 further comprising saving current data and shutting down the parallel computer if the current test value is below the predetermined tree performance threshold.

9. A parallel computer comprising a plurality of compute nodes and a data communications network that includes data communications links connected to the compute nodes so as to organize the compute nodes as a tree, the tree characterized by a root compute node and a plurality of tiers of compute nodes, the parallel computer comprising one or more processing sets including an I/O node and a plurality of compute nodes; and the parallel computer further comprising a computer processor, a computer memory operatively coupled to the computer processor, the computer memory having disposed within it computer program instructions capable of:
    selecting a set of test compute nodes, the test compute nodes being a subset of the compute nodes of the processing set;
    measuring the performance of the I/O node of the processing set;
    measuring the performance of the selected set of test compute nodes;
    calculating a current test value in dependence upon the measured performance of the I/O node of the processing set, the measured performance of the set of test compute nodes, and a predetermined value for I/O node performance;
    comparing the current test value with a predetermined tree performance threshold; and
    if the current test value is below the predetermined tree performance threshold, selecting another set of test compute nodes; and
    if the current test value is not below the predetermined tree performance threshold, selecting from the test compute nodes one or more potential problem nodes and testing individually potential problem nodes and links to potential problem nodes.

10. The parallel computer of claim 9 wherein computer program instructions capable of selecting a set of test compute nodes further comprise computer program instructions capable of mapping the tree structure of the compute nodes to physical locations of the compute nodes in the parallel computer.

11. The parallel computer of claim 9 wherein computer program instructions capable of selecting another set of test compute nodes further comprise computer program instructions capable of including within the set of test compute nodes the next tier of compute nodes in the processing set.

12. The parallel computer of claim 9 wherein computer program instructions capable of selecting from the test compute nodes one or more potential problem nodes further comprise computer program instructions capable of selecting the deepest tier of test compute nodes.

13. The parallel computer of claim 9 wherein computer program instructions capable of testing individually potential problem nodes and links to potential problem nodes further comprise computer program instructions capable of employing a high-overhead diagnostic to each potential problem node and each link to each potential problem node.

14. A computer program product for identifying failure in a tree network of a parallel computer, the parallel computer comprising one or more processing sets including an I/O node and a plurality of compute nodes, the computer program product disposed upon a recordable storage medium, the computer program product comprising:

computer program instructions for selecting a set of test compute nodes, the test compute nodes being a subset of the compute nodes of the processing set;

computer program instructions for measuring the performance of the I/O node of the processing set;

computer program instructions for measuring the performance of the selected set of test compute nodes;

computer program instructions for calculating a current test value in dependence upon the measured performance of the I/O node of the processing set, the measured performance of the set of test compute nodes, and a predetermined value for I/O node performance;

computer program instructions for comparing the current test value with a predetermined tree performance threshold; and computer program instructions for selecting another set of test compute nodes if the current test value is below the predetermined tree performance threshold; and computer program instructions for selecting from the test compute nodes one or more potential problem nodes and computer program instructions for testing individually potential problem nodes and links to potential problem nodes if the current test value is not below the predetermined tree performance threshold.

15. The computer program product of claim 14 wherein computer program instructions for selecting a set of test compute nodes further comprise computer program instructions for mapping the tree structure of the compute nodes to physical locations of the compute nodes in the parallel computer.

16. The computer program product of claim 14 wherein computer program instructions for selecting another set of test compute nodes further comprise computer program instructions for including within the set of test compute nodes the next tier of compute nodes in the processing set.

17. The computer program product of claim 14 wherein computer program instructions for selecting from the test compute nodes one or more potential problem nodes further comprise computer program instructions for selecting the deepest tier of test compute nodes.

18. The computer program product of claim 14 wherein computer program instructions for testing individually potential problem nodes and links to potential problem nodes further comprise computer program instructions for employing a high-overhead diagnostic to each potential problem node and each link to each potential problem node.

19. The computer program product of claim 14 wherein the recordable storage medium comprises a recordable medium.

* * * * *